United States Patent [19]

Yamada et al.

[11] Patent Number: 4,670,702
[45] Date of Patent: Jun. 2, 1987

[54] CONTROLLER FOR FUEL CELL POWER SYSTEM

[75] Inventors: Makoto Yamada, Katano; Kazuyoshi Tsukamoto, Osaka, both of Japan

[73] Assignee: Sanyo Electric Co., Ltd., Osaka, Japan

[21] Appl. No.: 883,403

[22] Filed: Jul. 8, 1986

[30] Foreign Application Priority Data

Jul. 16, 1985 [JP] Japan ................................. 60-157601

[51] Int. Cl.⁴ ......................................... H01M 10/44
[52] U.S. Cl. ......................................... 320/21; 320/3; 320/14; 307/66; 363/95
[58] Field of Search ........................ 320/3, 4, 15, 21, 8; 307/66

[56] References Cited

U.S. PATENT DOCUMENTS

| | | | |
|---|---|---|---|
| 3,423,599 | 1/1969 | Hovious | 320/15 X |
| 3,816,804 | 6/1974 | Cardwell, Jr. | 307/66 X |
| 3,823,358 | 7/1974 | Rey | 320/3 |
| 4,020,360 | 4/1977 | Udvardi-Lakos | 307/66 |
| 4,044,268 | 8/1977 | Hammel et al. | 307/66 |

*Primary Examiner*—Patrick R. Salce
*Assistant Examiner*—Marc S. Hoff
*Attorney, Agent, or Firm*—Armstrong, Nikaido, Marmelstein & Kubovcik

[57] ABSTRACT

A controller for a fuel cell power system comprises a main switching element inserted between a fuel cell power unit and a dc-ac converter, a secondary battery connected to a charging switching element and a discharging switching element, and a control circuit for switching elements, the charging switching element and discharging switching element being connected in series and across the main switching element. The secondary battery is charged by turning on the charging switching element when the fuel cell power unit is in warming up operation or when the dc-ac converter is broken off from the output circuit of the power unit to stop the operation of the fuel cell power unit, while the battery is discharged through the dc-ac converter by turning on the discharging switching element when the fuel cell power unit reaches the rated operating temperature.

1 Claim, 3 Drawing Figures

CONTROLLER FOR FUEL CELL POWER SYSTEM

FIELD OF THE INVENTION

This invention relates to a controller for fuel cell power systems.

BACKGROUND OF THE INVENTION

In a fuel cell power system, fuel cells are generally maintained at a suitable temperature even when the power system is out of operations to prevent their electrolyte from denaturation. For example, in a phosphoric acid electrolyte fuel cell power system, a fuel cell power unit or a fuel cell stack comprising a plurality of fuel cells is generally maintained at about 100° C. by a suitable heating means such as electric heaters, circulating heated gases and the like to prevent the phosphoric acid electrolyte from denaturation.

When starting up such a phosphoric acid electrolyte fuel cell power system, the fuel cell stack is firstly heated by the heating means to a temperature of about 120° C. at which fuel cell reactions may take place, and then process gases, i.e., fuel gas and process air are fed to the fuel cell stack to heat the same with heat of the fuel cell reactions. At the same time, a direct current load resistance is switched into an output circuit of the power system as a dummy load. When the temperature of the fuel cell stack reaches its optimum operating temperature of about 190° C., the fuel cell power system is operated in a steady state maintaining the rated output and the electric power generated is supplied to a load. The dummy load is then switched off.

During heating the fuel cell stack with the heat of reactions under load, however, the electric power generated is wastefully consumed as heat, resulting in lowering of an efficiency of power generation.

On the other hand, when stopping the operation of the fuel cell system, the load is disconnected from the output circuit of the fuel cell stack and the load resistance is switched into the output circuit as a dummy load to prevent the fuel cells from damage resulting from an overvoltage on open circuit. This also causes lowering of an efficiency of power generation.

The above disadvantage may be overcome by use of a secondary battery as shown in FIG. 3. The secondary battery (E) is connected to the output circuit of the fuel cell power unit (FC) and a load (L) is connected to the output circuit of the power unit (FC) through an inverter (INV) and a switch (SW). However, if the battery (E) is being fully charged, it is impossible to use it as the dummy load when heating the power unit (FC) with heat of the fuel cell reactions. In addition, it is impossible with the fully charged secondary battery (E) to inhibit an overvoltage which may occur when the load (L) is disconnected from the output circuit to stop the operation of the power unit.

SUMMARY OF THE INVENTION

It is therefore an object of the present invention to provide a controller for fuel cell power systems that makes it possible to minimize electric power loss when the fuel cell power unit is heated by the heat of fuel cell reactions under load.

Another object of the present invention is to provide a controller for fuel cell power systems that makes it possible to prevent a fuel cell power unit from damages resulting from the generation of overvoltage on open circuit, without deterioration of efficiency of the power unit.

According to the present invention, there is provided a controller for fuel cell power systems comprising a main switching element inserted between a fuel cell power unit and a dc-ac converter, a secondary battery connected to a charging switching element and a discharging switching element, and a control circuit for switching elements, said charging switching element and discharging switching element being connected in series and across the main switching element, said battery being charged by turning on the charging switching element while holding the main switching element off during heating operation of the power unit with the heat of fuel cell reactions, or during stopping operation of the power unit, said battery being discharged through the dc-ac converter by turning on the discharging switching element when the fuel cell power unit reaches its rated operating temperature.

In the fuel cell power system with the controller of the present invention, the electric power generated during heating operation of its power unit with the heat of fuel cell reactions is charged to the secondary battery, and the most part of the charged electric power is discharged as a regular electric power through the dc-ac converter to a load when the power unit is reached to the rated operating temperature. Thus, the present invention makes it possible to reduce consumption of the process gases, resulting in improvement in the power generation efficiency. Since the secondary battery is being discharged before the rated operation of the fuel cell power unit, the electric power generated during the stopping operation of the power unit is charged to the secondary battery through the charging switching element, thus making it possible to prevent the fuel cell power unit from generation of overvoltage.

DETAILED DESCRIPTION OF THE PREFERRED EMBODIMENT

Figure 1:
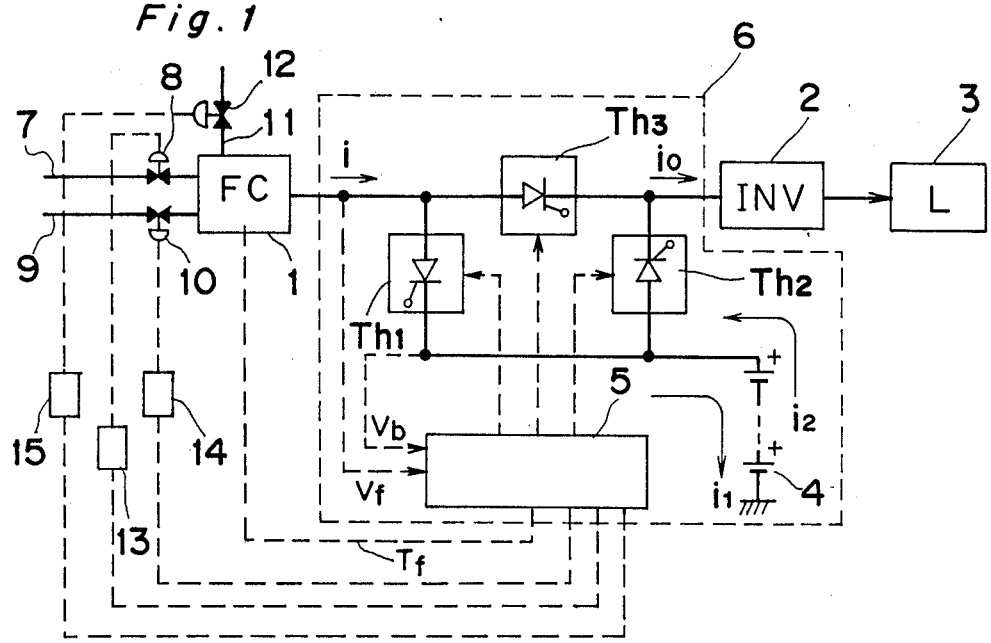
FIG. 1 is a block diagram of a fuel cell power system with a controller according to the present invention.

Referring now to FIG. 1, a fuel cell power system generally comprises a fuel cell power unit (1), a dc-ac converter (2), so-called an inverter, and a controller 6 arranged between an output circuit of the power unit (1) and the dc-ac converter. The power unit (1) comprises a stack of fuel cells and is joined to a fuel gas supply pipeline (7), a process air supply pipeline (9), and a cooling gas supply pipeline (11), each of which is provided with a flow control valve (8), (10) and (12). The fuel cell power unit (1) is provided with a temperature detector (not shown) to detect its temperature ($T_f$). An electrical output of the detector is fed to a control circuit (5) mentioned below.

The controller (6) comprises a main switching element ($Th_3$), a charging switching element ($Th_1$), a discharging switching element ($Th_2$), and a secondary battery 4. The main switching element ($Th_3$) is inserted between the fuel cell power unit (1) and the converter 2, while the switching elements ($Th_1$) and ($Th_2$) are connected in series and across the main switching element ($Th_1$) as shown in FIG. 1. The switching elements (Th$_1$), (Th$_2$), and (Th$_3$) may be semiconductor switching elements such as thyristors, power transistors and the like. In this embodiment, thyristors are used and controlled by a control circuit (5) including well-known thyristor choppers (not shown). An output voltage (V$_f$) of the power unit (1) is fed to the control circuit (5) as well as a terminal voltage (Vb) of the secondary battery (4). Output terminals of the control circuit (5) are connected to the flow control valves (8), (10) and (12) through drivers (13), (14) and (15).

When starting the operation of the fuel cell power system, the controller is powered on and the power unit (1) is firstly heated by a suitable heating means such as an electric heater in the conventional manner. During this preliminary heating, all the flow control valves (8, 9 and 10) are closed and all the switching elements (Th$_1$, Th$_2$ and Th$_3$) are held off. When the temperature (Tf) of the power unit (1) reaches a predetermined temperature (generally, about 120° C.) at a time (t$_0$) in FIG. 2, the drivers (13) and (14) are respectively controlled by the control circuit (5) to open the flow control valves (8) and (10). Thus, process gases, i.e., fuel gas and process air are supplied to the fuel cell power unit (1), gradually generating heat of fuel cell reactions and an electric power.

When an output voltage (Vf) on open circuit of the power unit (1) is reached to a predetermined voltage (V$_1$) at time (t$_1$), the charging switching element (Th$_1$) is fired by the control circuit (5) while the main switching element (Th$_3$) is being held off. Thus, the secondary battery (4) is switched into the output circuit of the power unit (1) as a dummy load and the current (i) is delivered as a charging current (i$_1$) from the power unit (1) to the secondary battery (4). This load running facilitates rise in temperature of the power unit (1).

During this heating operation with the heat of reactions under load, the charging switching element (Th$_1$) is chopper-controlled by the control circuit (5) to allow the fuel cell power unit (1) to supply electric power to the secondary battery (4) at a voltage (V$_f$) equal to or lower than the rated voltage (V$_1$) in proportion to the temperature (T$_f$) of the fuel cell stack.

When the fuel cell power unit (1) is reached to its optimum operating temperature (about 190° C.) at time (t$_2$), the discharging switching element (Th$_2$) is turned on by the control circuit (5) and an current (i$_2$) is delivered from the secondary battery (4) to the converter (2) through the discharging switching element (Th$_2$) together with the current (i) from the power unit (1). At the same time, the process gas supply is so adjusted by the flow control valves (8) and (10) that the current (i) delivered from the power unit (1) is reduced to a predetermined value, for example, about 25% of the rated current. This causes decrease in the heat of the fuel cell reactions, resulting in cessation of rise in the operating temperature of the power unit. However, the power unit (5) is maintained at the optimum operating temperature since the flow control valve (12) for the cooling gas is being held closed even in this stage. When there is some variations in load (L), the charging switching element (Th$_1$) is chopper-controlled by the control circuit (5) to increase the current (i) in correspondence to the load variation. Thus, a current (i$_0$) which is the sum of the current (i) and (i$_2$) is kept constant and delivered as the rating current from the power system through the dc-ac converter (INV).

When the terminal voltage (Vb) of the secondary battery (4) is lowered to a predetermined value, or, its discharge end voltage, the switching elements (Th$_1$) and (Th$_2$) are turned off by the control circuit (5) and the switching element (Th$_3$) is turned on. Thus, the fuel cell power unit (1) is directly connected to the converter (2) through the switching element (Th$_3$). At the same time, the the flow control valves (8) and (10) are fully opened by the drivers (13) and (14) to operate the power unit (1) at the rated conditions. The electric power generated is supplied to the load (3) through the converter (2). The flow control valve (12) is controlled by the control circuit to maintain the power unit (1) to its optimum operating temperature of about 190° C.

When stopping the operation of the fuel cell system, or when the dc-ac converter (2) must be shut off, the charging switching element (Th$_1$) is turned on, at time t$_4$, simultaneously with the shutting off of the converter (2). At the same time, the main switching element (Th$_3$) is turned off and the current (i) from the fuel cell power unit (1) is delivered as a charging current (i$_1$) to the secondary battery (4). The output voltage of the fuel cell power unit is maintained to a voltage below the rating voltage (V$_1$), thus making it possible to prevent the fuel cell power unit from the generation of overvoltage.

Figure 2:
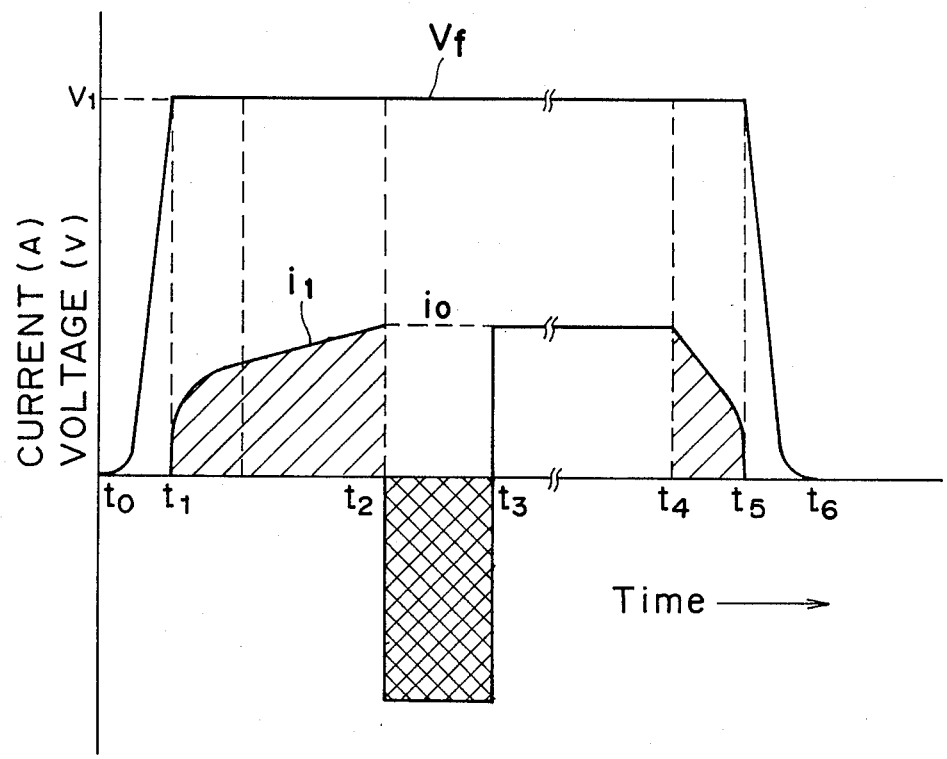
FIG. 2 is voltage-current characteristics of the controller of FIG. 1.
Figure 3:
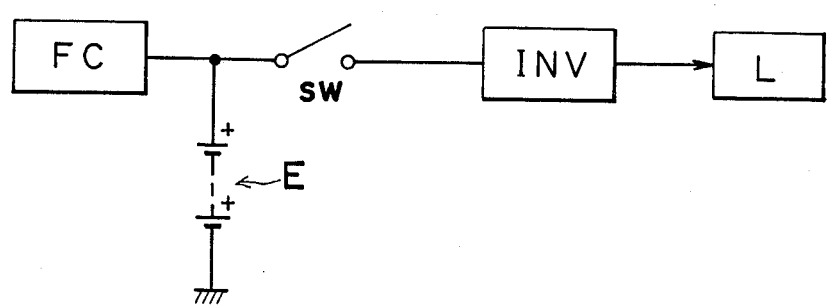
FIG. 3 is a block diagram of a fuel cell power system with a controller of the prior art.

In FIG. 2, shaded regions between t$_1$ and t$_2$ and between t$_4$ and t$_5$ show the electric capacity charged to the secondary battery (4) during the heating operation of the power unit with the heat of fuel cell reactions, and during stopping operation of the power system, respectively. A region with crossed lines between t$_2$ and t$_3$ shows the capacity discharged from the secondary battery.

A 50 kW fuel cell power unit with a 330-cell stack has a rated voltage of 200 V and a rated current of 250 A. Thus, it is required to use a secondary battery with a capacity of 375 Ah and a voltage of 200 V as a load for the fuel cell power unit when heating the power unit with the heat of fuel cell reactions, and as a voltage controller for preventing overvoltage on open circuit of the power unit. In this case, the time for heating the fuel cell power unit with the heat of reactions is about 1 hour. Thus, the capacity charged during a period of time between t$_1$ and t$_2$ is about 200 to 230 Ah. When a rated load (L) of the fuel cell power unit is switched on, a current (i$_0$) of 250 A (200 V) which is the sum of the currents (i$_2$) and (i) is delivered from the power system. In this case, the battery is discharged at about 190 A (200 V). Thus, the discharging time, i.e., the time between t$_2$ and t$_3$ is about 1 hour.

As will understood from the above, according to the present invention, no electric power loss occurs when warming up the fuel cell power unit, thus making it possible to improve the efficiency of the power generation. In addition, when the converter is shut off, no overvoltage is applied to the fuel cell power unit since the output circuit of the power unit is connected to the secondary battery. Thus, there is no fear of damage resulting from the overvoltage. Accordingly, it is possible to achieve simplification of the power system and improvement in its efficiency.

What I claim is:

1. A controller for fuel cell power systems comprising a main switching element inserted between a fuel cell power unit and a dc-ac converter, a secondary battery connected to a charging switching element and a discharging switching element, and a control circuit for switching elements, said charging switching element and discharging switching element being connected in series and across the main switching element, said battery being charged by turning on the charging switching element while holding the main switching element off during heating operation of the power unit with the heat of fuel cell reactions, or during stopping operation of the power unit, said battery being discharged through the dc-ac converter by turning on the discharging switching element when the fuel cell power unit reaches its rated operating temperature.

* * * * *